No. 839,136. PATENTED DEC. 25, 1906.
R. HADDEN & C. SENN.
NON-SIPHON TRAP.
APPLICATION FILED DEC. 5, 1905.
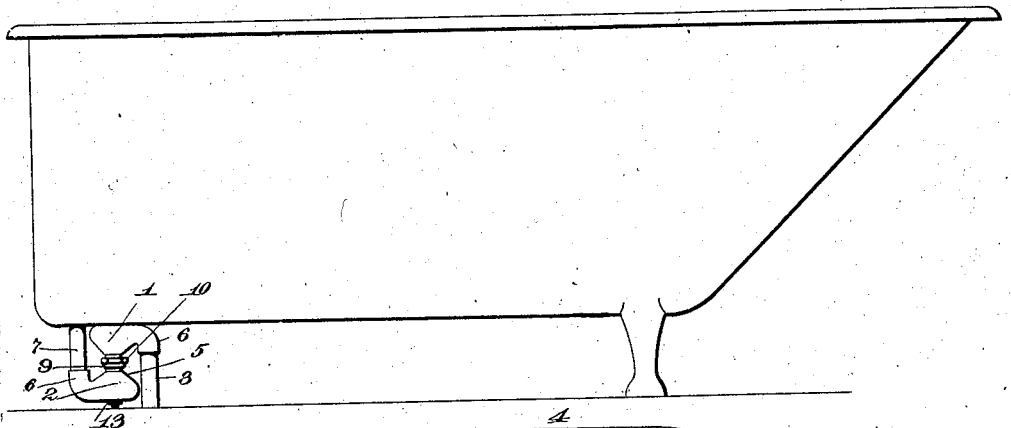
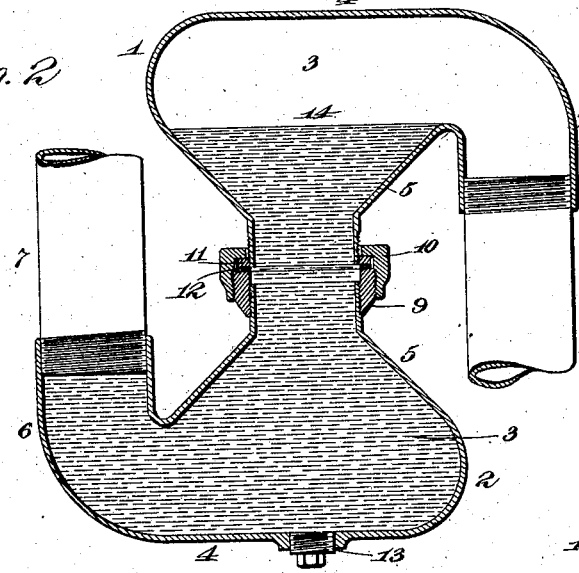
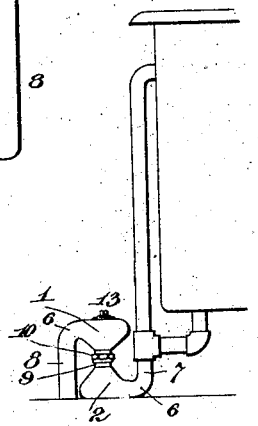
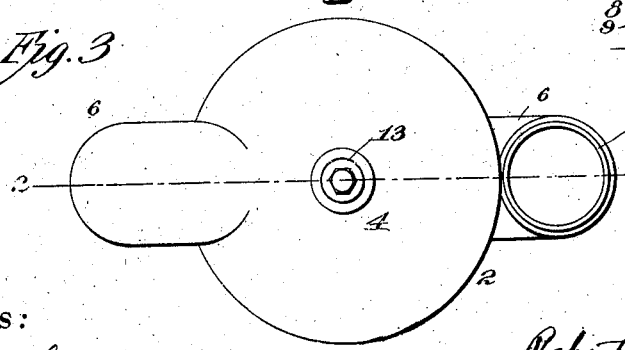
Witnesses:
Jas. F. Coleman
John A. Losh
Inventors
Robert Hadden
Charles Senn
By Dyer & Dyer
Attorneys.

UNITED STATES PATENT OFFICE.

ROBERT HADDEN AND CHARLES SENN, OF ATLANTIC CITY, NEW JERSEY.

NON-SIPHON TRAP.

No. 839,136.     Specification of Letters Patent.     Patented Dec. 25, 1906.

Application filed December 5, 1905. Serial No. 290,504.

*To all whom it may concern:*

Be it known that we, ROBERT HADDEN and CHARLES SENN, citizens of the United States, and residents of Atlantic City, county of Atlantic, and State of New Jersey, have invented a certain new and useful Improvement in Non-Siphon Traps, of which the following is a description.

The object we have in view is the production of a non-siphon trap. This trap may be used in connection with any type of fixture—such as bath-tubs, sinks, and washstands—but is particularly applicable to bath-tubs and for use in bath-rooms.

Further objects are to produce a trap which can be constructed cheaply, which will not possibly siphon, and which will be of minimum height, so that, if desired, in use in connection with bath-tubs it may be placed above the floor and yet under the bath-tub.

Further objects are the production of a trap which may be accessible for repairs and for the purpose of removing objects which may accidentally fall into it; and a still further object is the production of a trap which the position of the inlet and outlet pipes may be adjusted to connect with the plumbing.

We attain these objects by means of the mechanism illustrated in the accompanying drawings, in which—

Figure 1 is an elevation of a bath-tub, showing attached thereto a trap embodying our invention. Fig. 2 is an enlarged sectional view taken on the lines 2 2 of Fig. 3. Fig. 3 is a bottom plan view of the trap. Fig. 4 is a detail view of the trap used in connection with a bath-tub and placed to one side of the tub and connected to both overflow and waste pipes.

In all of the views like parts are designated by the same reference characters.

In carrying out our invention we provide two trap-bodies 1 2, secured together and constituting a water-chamber. These two trap-bodies are preferably essentially alike. They may be made of any material of which traps are commonly made, such as copper, lead, or other metal. Each body is in the form of an enlarged chamber 3, having a flat base 4 and a tapering or restricted neck 5. Connecting the body on the side and adjacent to the base is the inlet or outlet passage 6 in the form of a nipple. Each nipple is provided with means for attachment to the inlet and exit pipes 7 and 9, respectively.

By leading off the pipes from the side the height of the trap is restricted, and it is possible to place it below an ordinary bath-tub and at the same time above the floor. The neck 5 of each body is considerably smaller than the chamber 3.

The two necks of the two bodies which constitute the trap are connected together by a suitable coupling so that a complete trap will be formed. By tapering the bodies to the shape of necks a coupling of manageable size is permissible. The coupling is preferably made so that one body may be adjusted in relation to the other, so that the lead-off and inlet pipes may be properly located to connect with the plumbing. This will be done by suitably adjusting one body in relation to the other so that the nipples will be in proper position. The coupling permits this to be done, and the shape of the bodies allows of a coupling of moderate size, which may be adjusted by ordinary tools. A very satisfactory form of coupling is shown in the drawings. The neck of one of the bodies is provided with threads, to which is attached a washer 9. The threads which connect the washer and the neck are preferably small threads, and the washer may be further attached to the neck by soldering. The washer 9 is provided with a male thread which engages with a flange-coupling 10, which has an engaging female thread. This coupling engages with a ledge or shoulder 11, formed upon the neck 5 on the upper body 1. The shoulder or ledge is in the form of a ring, which may be secured to the neck of the body by screw-threads, as shown, and in addition, if necessary, with solder. Before the shoulder 11 is secured to the neck of this body the coupling 10 is slipped over the neck. In securing the two bodies together a washer 12, of flexible material, is first introduced and the coupling then screwed upon the ring 9 until the ledge or shoulder 11 forces the washer 12 against the sleeve 9, and a tight joint is provided. Before this is done, however, the two bodies are adjusted in the proper relation so that the lead-off pipes will lead in the proper direction. The coupling 10 is so shaped as to be engaged by a wrench. (See Fig. 1.) The coupling 10 will ordinarily be designed to be of such a size that it may be adjusted by an ordinary wrench. The small size of the coupling is made possible by the shape of the bodies.

The lower body 2 is preferably provided with a manhole or vent 13, which may be closed by a plug, a screw-plug being illustrated. This manhole will be lower than the inlet-pipe. Therefore objects falling into the trap will enter the chamber and may be readily removed. This is particularly advantageous in removing objects which may accidentally fall into the fixture without the necessity of calling in the services of a plumber.

As shown in Fig. 4, the manhole or vent 13 is arranged in the upper body. This permits the trap to rest upon the floor, and the inside may be reached for the removal of foreign objects. In Fig. 4 the trap is shown in connection with a bath-tub and is connected to both the overflow and waste pipes. It is to be understood that the trap is not limited for use in connection with bath-tubs, as it may be employed in connection with any fixture. Ordinarily in connection with sinks, washstands, &c., the trap will be set as shown in Fig. 1 with the vent $k^3$ in the lower body.

In operation the body 2 and the neck of the body 1 will be filled with water to the level indicated at 14. When the fixture is emptying, the water will flow down the pipe 6, through the body 2 to the body 1, and through the pipe 8. Should the column of water in the pipe 8 be sufficiently long to produce a vacuum in the trap when the fixture is empty, the trap will not empty and the seal will not be broken. This is made possible owing to the size of the chambers 3 within the bodies, which provides a sufficient bulk of water to prevent both of the bodies being emptied by the suction action of the pipe 8. The location of the lead-off pipe at the side also tends to prevent siphoning. Were it on the top, a portion of the water in the trap would be blown upward by the air-pressure and would enter the lead-off pipe. By having the latter on the side this will not occur.

In use it is found that the seal cannot possibly be broken by any siphoning action of the draw-off pipe.

Having now described our invention, what we claim as new, and desire to secure by Letters Patent, is—

1. A non-siphon trap having two water-chambers, which are connected together by a tapering neck, and having pipes, said pipes leading off and on the sides of the chambers, whereby a long seal will be produced, with a low trap.

2. A non-siphon trap having two bodies, each with a lead-pipe, the said bodies each having a restricted neck, and means for connecting the two necks, so as to permit the adjustment of one body in relation to the other and allow the lead-pipes to be properly located to connect with the plumbing.

3. A non-siphon trap having two bodies, each with a lead-pipe, the said bodies each having a restricted neck, and a coupling connecting the two necks.

4. A non-siphon trap having two bodies, each with a lead-pipe, the said bodies each having a restricted neck, and an adjustable coupling connecting the two bodies, the said coupling permitting adjustment of the bodies to suit the location of the plumbing.

5. A non-siphon trap comprising two bodies each of a like configuration, each having an enlarged portion and a restricted neck, and a coupling connecting the two necks.

6. A non-siphon trap comprising two bodies, each of a like configuration, each having an enlarged portion with a nipple for a lead-pipe on the side, and a restricted neck, and a coupling connecting the two necks.

This specification signed and witnessed this 28th day of May, 1906.

ROBERT HADDEN.
CHARLES SENN.

Witnesses:
LEONARD H. DYER,
AUG. LONG.